Sept. 11, 1956
E. C. STERNAMAN
2,762,511
DEVICE FOR REMOVING LIQUIDS FROM
DIFFERENT LEVELS IN TANKS
Filed Aug. 18, 1952
3 Sheets-Sheet 1
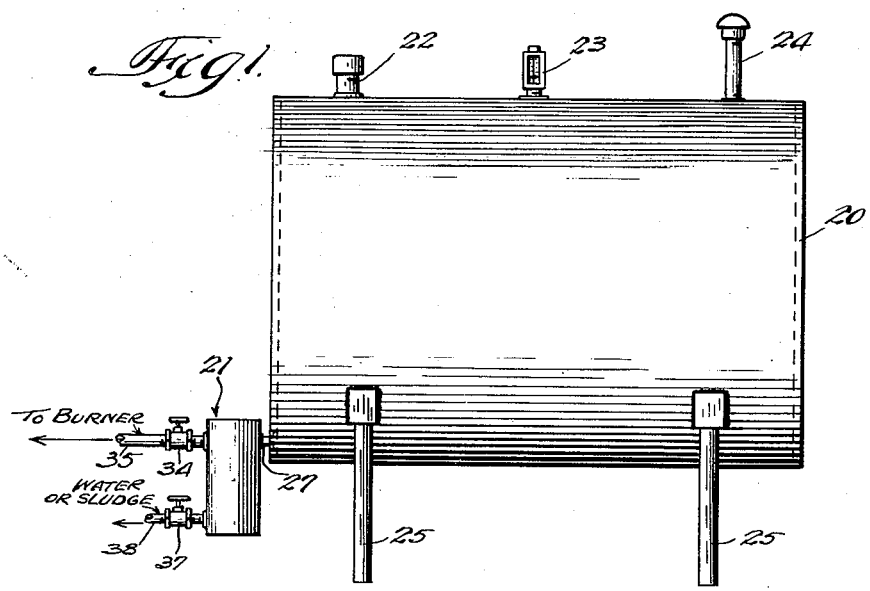
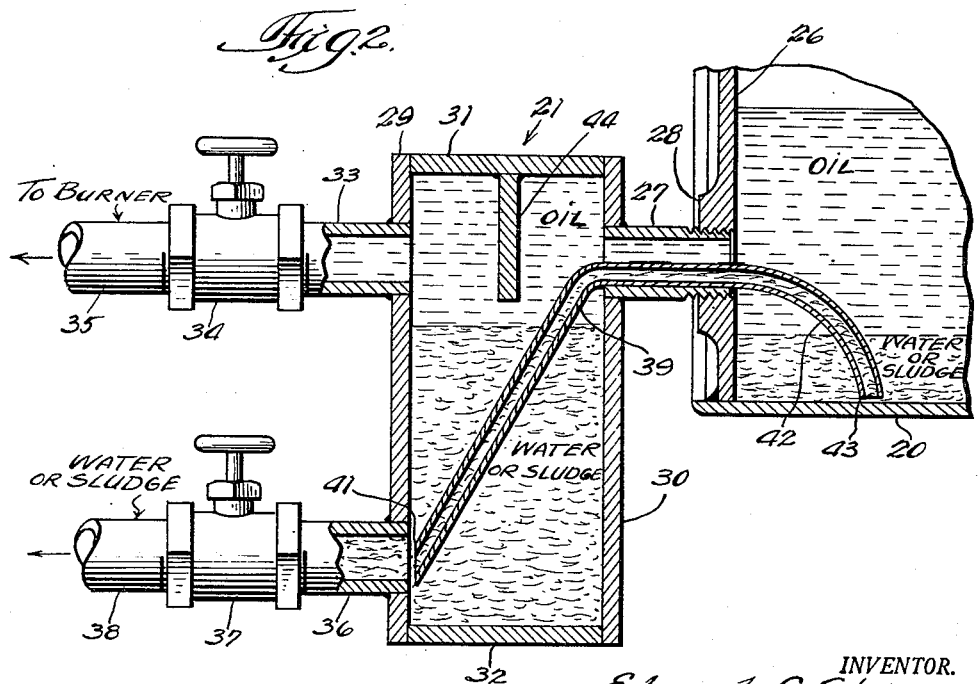
INVENTOR.
Edward C. Sternaman
BY
Thiess, Olson & Mecklenburger
Attys.

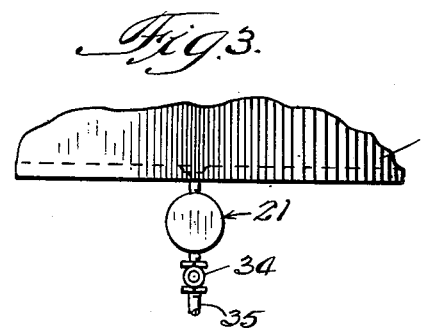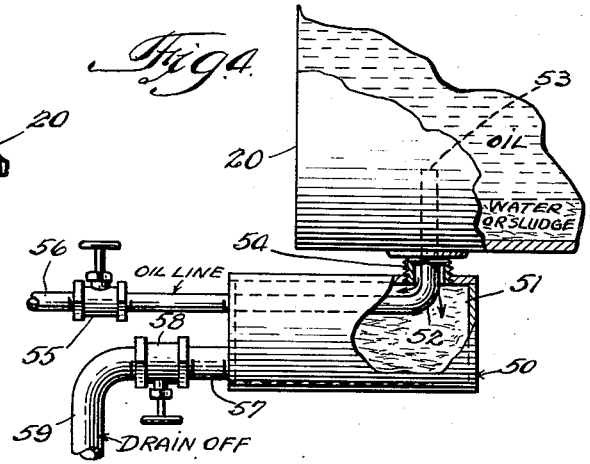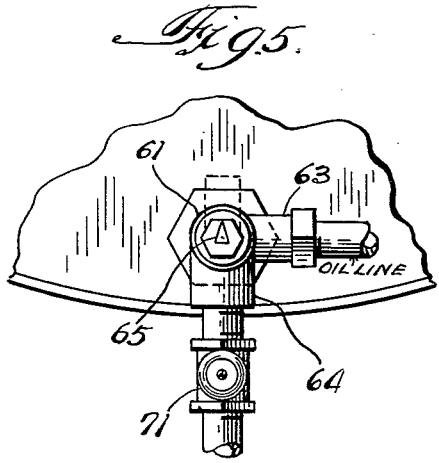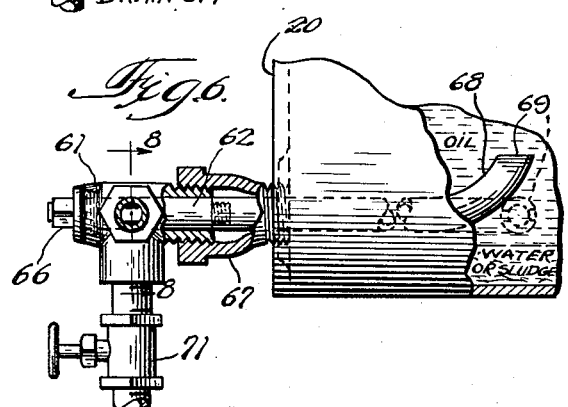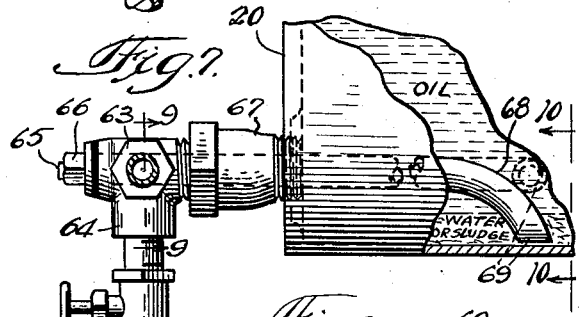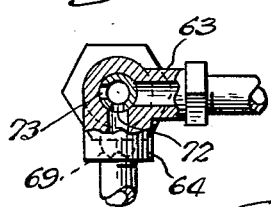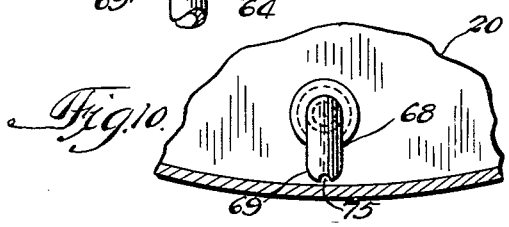

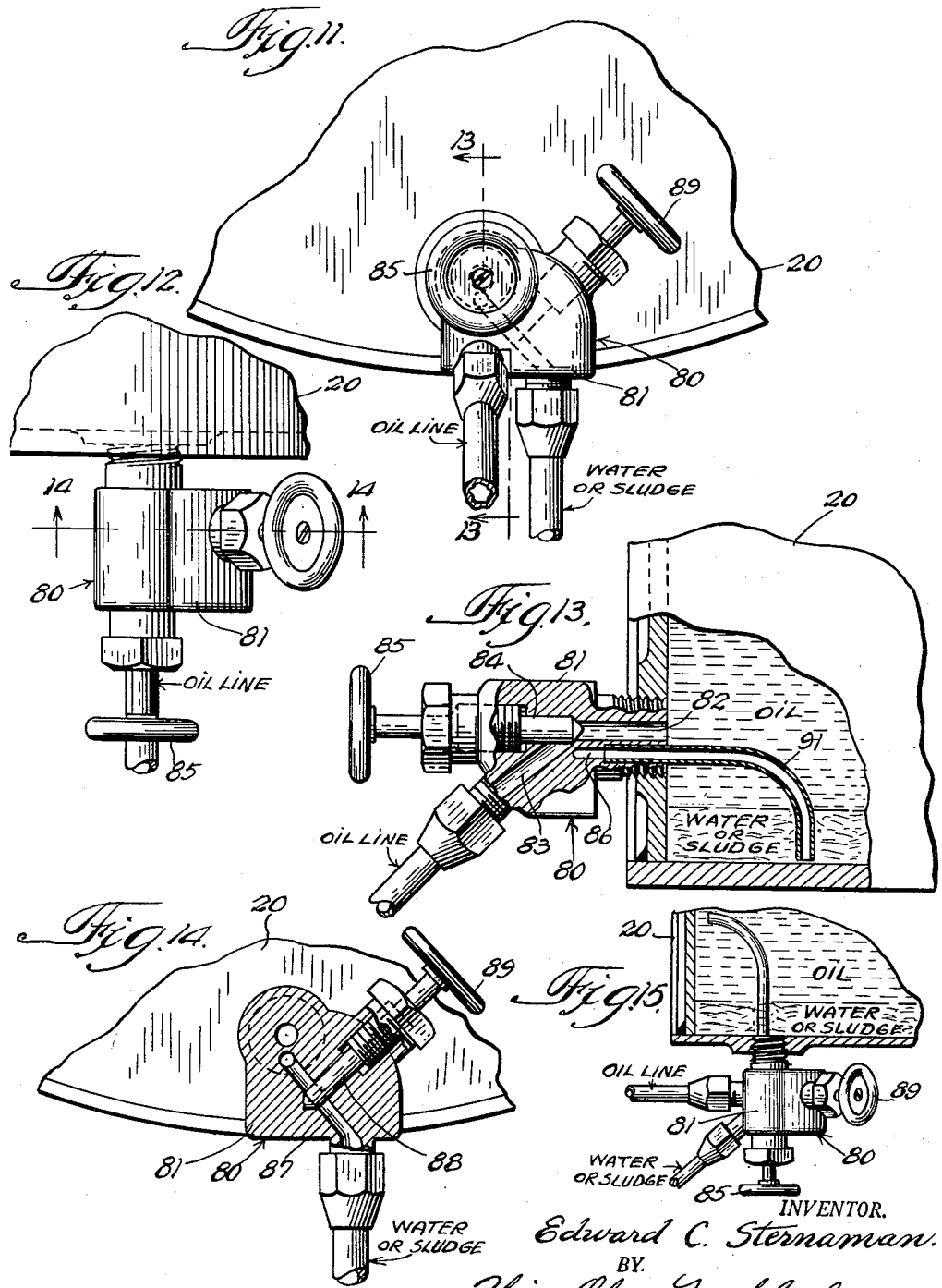

United States Patent Office 2,762,511
Patented Sept. 11, 1956

2,762,511

DEVICE FOR REMOVING LIQUIDS FROM DIFFERENT LEVELS IN TANKS

Edward C. Sternaman, Chicago, Ill.

Application August 18, 1952, Serial No. 304,954

2 Claims. (Cl. 210—55)

This invention relates to devices for enabling the removal of liquid from different levels in tanks, more particularly to such devices for enabling the removal of water, sludge and the like from the bottom of oil tanks, for example, without the need of emptying the tank and it is an object of the invention to provide improved devices of this character.

It is a further object of the invention to provide improved devices of the character indicated which are adaptable to be attached to the side wall or end wall or to the bottom of a tank.

It is a further object of the invention to provide, in devices of the character indicated, improved means for starting the flow of water or sludge.

Considerable trouble has been experienced by the users of fuel oil in that the fuel oil storage tanks have corroded through at the bottom, thereby making it necessary to remove the tank and either to replace it with a new one or to repair it. Also, the pump and other apparatus in the fuel line leading from the oil tank to the burner have corroded sufficiently to require replacement. It has been found that a major proportion of these difficulties is caused by an accumulation of water in the bottom of the fuel oil tank. Apparently, some corrosive elements exist in the accumulated water along with sediment of one sort or another which may form a sludge. The corrosive elements acting upon the tank cause it to become eaten away until the wall of the tank is perforated. In instances in which the delecterious effects have not proceeded so far, it may still happen that the accumulated water will rise to a sufficient level so as to be drawn into the fuel line in the case of the fuel line being connected to the side or end of the tank. If the fuel line is taken from the bottom of the tank, the accumulated water, of course, flows directly into it. The water comes into contact with the fuel pump and other apparatus and causes it to corrode. If the water reaches the burner, the flame goes out with consequent inconvenience. It is known that water in fuel oil is harmful and various precautions have been taken to prevent it. However, water vapor in the air in the tank may condense under some conditions and the resulting water accumulates in the bottom of the tank. This process may go on for a relatively long time, perhaps years, before difficulty is experienced. On the other hand it may occur after the tank has been in use for only a short time.

The removal of and the repair or replacement of tanks, pumps and associated apparatus is expensive. Accordingly, it is a further object of the invention to provide an improved device for enabling the removal of water and sludge from the bottom of fuel oil tanks which is inexpensive, simple to make, and easy to use.

By means of the invention a user of fuel oil can determine in a simple manner whether or not there is water in the bottom of the fuel tank and to remove it if there is.

According to one form of the invention, there is provided a device for removing liquid from one level in a container and for siphoning liquid therefrom below such one level which comprises a chamber, inlet means at the upper end thereof for connection to the container, outlet means at the upper end of the chamber for liquid from such one level, outlet means at the lower end of the chamber for liquid from below such one level, and a pipe extending through the inlet means and being of substantially less cross-sectional area than the inlet means, one end of the pipe terminating adjacent the lower outlet means and the other end of the pipe being adapted to project into the container to the level at which siphoning is to occur.

Further objects and advantages will appear to those skilled in the art as the description proceedes and for a more complete understanding of the invention reference should be had to the accompanying drawings in which:

Fig. 1 is a side view of apparatus embodying the invention in association with a fuel oil tank;

Fig. 2 is a fragmentary view partially in section and on a larger scale of the apparatus shown in Fig. 1;

Fig. 3 is a fragmentary top plan view of the apparatus shown in Fig. 1;

Fig. 4 is a side elevational view partially in section of a modified form of apparatus embodying the invention;

Fig. 5 is an end view of apparatus forming another embodiment of the invention;

Fig. 6 is a side view partially in section of the apparatus shown in Fig. 5;

Fig. 7 is a side view similar to Fig. 6 with one of the operating parts in a different position;

Fig. 8 is a sectional view taken substantially in the direction of arrow 8—8 of Fig. 6;

Fig. 9 is a sectional view taken substantially in the direction of arrow 9—9 of Fig. 7;

Fig. 10 is a view taken substantially in the direction of arrows 10—10 of Fig. 7;

Fig. 11 is an end view of apparatus forming another embodiment of the invention;

Fig. 12 is a top view of the apparatus shown in Fig. 11;

Fig. 13 is a sectional view taken substantially along the line 13—13 of Fig. 11;

Fig. 14 is a sectional view taken substantially along the line 14—14 of Fig. 12, and Fig. 15 is a side view partially in section of the device illustrated in Fig. 11 disposed so as to be connected to the bottom of a tank.

Referring to the drawings there is shown in Fig. 1 an ordinary oil tank 20 to which the device 21 forming one embodiment of the invention is attached.

The oil tank 20 is shown as being provided wtih an inlet 22, a level gauge 23, and an air valve 24, and is disposed to rest upon legs 25. The device 21 is shown attached to the end wall 26 of the tank, as may be seen best in Fig. 2, by a nipple 27 which is threaded to a boss 28 in the end walls 26 in the usual manner.

The device 21 comprises a tank or a chamber 29 which may be of any desired shape. As shown in Fig. 2, the chamber of the device comprises a cylindrical wall 30 into which the end plates 31 and 32 have been disposed and sealed by any suitable means such, for example, as welding or brazing. The nipple 27 is attached to the upper end of the cylindrical wall 29 by welding or brazing, for example, and the chamber projects downwardly below the lower edge of the tank a considerable distance. Also, near the upper end of the cylinder 29 there is an outlet nipple 33 to which a valve 34 is attached and from which the pipe 35 conducts fuel oil to the burner. Although not essential to the invention, the outlet 33 may be disposed at about the same height as the inlet nipple 27.

Near the lower end of the chamber 29 there is an outlet nipple 36 to which a valve 37 is attached and from which a pipe 38 may conduct water, sludge or the like which is being removed from the bottom of the tank 20.

Disposed within chamber 29 and projecting outwardly through the nipple 27 is a conduit 39 whose cross-sectional area may be about half that of the nipple 27 so that sufficient area is had through which the respective liquids flow. The portion of conduit 39 inside of chamber 29 projects downwardly and has one end 41 terminating closely adjacent to the opening of nipple 36. The end 41 may be beveled with respect to the axis of the conduit, as shown, in order to facilitate bringing the end 41 close to the opening of nipple 36. The conduit 39 has a portion 42 which projects outwardly of the nipple 27 so as to be disposed within the oil tank 20 when the device 21 is attached thereto. The portion 42 may be curved as shown or bent so that the end 43 thereof is disposed downwardly of the nipple 27. The end 43 preferably should be disposed as close to the bottom of the tank as possible in order that all water or sludge may be removed.

The conduit 39 may be held firmly in the position shown by any suitable means such, for example, as welding to the nipple 27.

To attach the device 21 to the tank 20, it is only necessary to screw the nipple 27 into the corresponding threaded hole in boss 28. The pipes 35 and 38, of course, are unattached while this step is being carried out and the valves 34 and 37 preferably are closed. The tank 20 may be filled with oil and no substantial loss will result while the device 21 is being attached since the portion 42 of the conduit may be quickly inserted into the tank and the nipple screwed in to the boss 28. A relatively small number of turns will suffice to firmly attach the device 21 to the tank. During the attaching process the device 21 may be disposed upside down briefly in order to allow the conduit 39 to fill with oil. Then, when the device is completely attached the conduit 39 as well as the space inside of the chamber 29 will be completely filled with oil. Of course, if the tank 20 is empty when the device 21 is attached, it will fill up after oil is in the tank. When the device is finally attached to the tank 21, it will be disposed as seen in Fig. 2 with the end 43 of conduit 29 near the bottom of the tank and thus projecting into whatever water or sludge is there. Such entrapped air as exists inside the cylinder 29 may be allowed to escape by opening the valve 34.

During normal use of the device, when it is attached as described, the conduit 39 will be filled with oil even though the end 43 is projecting into water or sludge.

To start the siphoning action by means of which the water or sludge is removed, it is necessary to open valve 37 to its widest position so that oil inside of chamber 29 will flow out rapidly. The flow of oil outwardly through nipple 36 sets up an aspirating effect at the end 41 of conduit 39. This aspirating action causes the oil, which is inside of the conduit, to flow outwardly and causes the conduit 39 to fill with water or sludge from that accumulated on the bottom of tank 20. When the conduit 39 has filled with water or sludge, it has been found that it will remain so and that the cylinder 29 fills up with water or sludge to the same height as it is in the bottom of tank 20. Once this has occurred, it is only necessary to open the valve 37 and water or sludge runs out until all of that accumulated in the bottom of tank 20 is removed. Thus, it is apparent that a user of oil need only occasionally to open valve 37 to determine first of all whether there is any accumulation of water or sludge in the oil tank and to remove it if there is. In order to be assured that sufficient aspirating action may be obtained to start flow in conduit 39, the nipple 27 must be of sufficient cross section.

It is assumed that sludge in the tank is fluid enough to flow. It can be made so by stirring, for example.

Oil accumulates in chamber 29 on top of the water or sludge so that the nipple 33 is in communication with a mass of oil and when valve 34 is opened oil, of course, will flow out. This is on the assumption that the water or sludge level in the tank is below the nipple 27. Since the oil floats on top of the water, it remains free of water and the oil drained off through nipple 33 is free of water and thus the burner, oil pump and other apparatus are not harmed by the effects of water.

To assure further that the oil and water become separated, a baffle 44 may be disposed between the nipple 27 and the nipple 33. Hence, oil flowing through the device must first pass underneath the baffle which process tends to separate the water from the oil due to the greater density of water or sludge.

While the water or sludge removing nipple 36 is disposed in the side of chamber 29, it will be clear that it may be disposed on the bottom so long as the end 41 of conduit 39 is disposed closely adjacent thereto.

It will be clear that the lower end of chamber 29 must extend at least to the bottom of tank 20 and preferably is disposed a substantial distance below in order to allow the water or sludge to accumulate.

Referring to Fig. 4, there is shown a modified form of the device 50 in which the siphoning action utilized in the device as shown in Fig. 2 is not needed. The device 50 is attached to the bottom of the tank 20 so that the force of gravity is available for causing both the oil and water or sludge to start flowing.

The device 50 comprises a cylindrical chamber 51 within which a conduit 52 is held substantially as shown. The conduit 52 may be held, for example, by means of welding in the left end member of chamber 51. The conduit 52 is provided with a portion 53 which extends upwardly into the tank 20 to any desired level. A threaded nipple 54 attaches the device 50 to the tank and is of sufficient diameter so as to leave a substantial area for liquid to flow through when the portion 53 is disposed upwardly therein. The conduit 52 may extend on through the chamber 51 and a valve 55 may be disposed thereon to control the flow of oil through a pipe 56 to an oil burner. Also attached to the chamber 51 is a nipple 57 to which a valve 58 is connected for controlling flow of water or sludge through a pipe 59. The nipple 57 communicates directly with the inside of chamber 51.

In operation, after the device is attached to the bottom of the tank substantially as shown, any water or sludge accumulated flows through the inside of nipple 54 and into the chamber 51. It is assumed that the level of water or sludge is below the top of the portion 53 of the conduit 52. Oil, accordingly, flows through the conduit 53 and may be taken off through the valve 55. To remove water or sludge, it is necessary only to open valve 58 thereby allowing the water or sludge accumulated in chamber 51 to flow outwardly. The water or sludge in the bottom of tank 20 continues to flow into the chamber 51, as described, and out through valve 58 so long as this valve remains open.

In Figs. 5 to 10 there is disclosed a further embodiment of the invention by means of which oil, for example, may be removed from the tank at one level and water or sludge may be siphoned from the tank at a lower level.

In Figs. 5 to 10 there is disclosed a further embodiment of the invention by means of which oil, for example, may be removed from the tank at one level and water or sludge may be siphoned from the tank at a lower level.

Referring to these figures, there is shown essentially a valve housing 61 inside of which there is mounted a more or less usual valve member 62 the inside of which forms essentially a chamber. The valve housing 61 is provided with a pair of outlets 63 and 64 through which the liquids are disposed to flow. The valve member 62 is adapted to have three positions which are indicated by means of the arrow 65 on the back of a hexagonally formed nob 66 which is the rearward end of valve member 62. A wrench may be applied to the nob 66 and the valve member 62 turned to any one of the three positions. The first position is that which may be seen in Fig. 5 in which the arrow 65 is pointing upwardly; the second position is that when the arrow 65 has been rotated clockwise to point in the direction of valve outlet 63; and the third position is that when the arrow 65 is pointing downwardly toward the valve outlet 64. The valve housing 61 is held to the side of the tank 20 by means of an adapter 67 substantially as shown in Fig. 6.

A pipe or conduit 68 is attached to the valve member 62 so as to form a substantially continuous passageway therewith, the end 69 of the pipe 68 being curved, as shown, and being disposed upwardly in Fig. 6. When the valve member 62 is rotated as already described, the end 69 is disposed upwardly in the first position as shown by the solid lines in Fig. 6; is disposed horizontally in the second position as indicated by the dotted lines in Figs. 6 and 7; and is disposed downwardly in the third position as may be seen in Fig. 7. When the end 69 is disposed downwardly as shown in Fig. 7, water or sludge may be siphoned off through the valve outlet 64 and a valve 71 arranged for this purpose. The water or sludge level is assumed to lie below the opening in tank 20 into which the adapter 27 is received. The end 69 of the pipe is so disposed relative to the horizontal axis of the valve member 62 and the pipe 68 so as to come closely adjacent the bottom of tank 20 as may be seen best in Figs. 7 and 10.

Referring more particularly to Figs. 6 and 8, the construction of valve member 62 may be seen best in order to permit the flow of oil when the end of pipe 69 is disposed upwardly. The valve member 62 is provided with two openings 72 and 73 disposed substantially at right angles to each other. The inside of valve member 62 may be considered a chamber 74 which is in communication with the oil in tank 20 through pipe 68. Since the opening 73 is in communication with the inside of valve outlet 63, it will be seen that in the upward position of end 69 oil flows through pipe 68 and out through valve outlet 63 to a burner for example.

When the end 69 of pipe 68 is disposed horizontally, the opening 72 in valve body 62 is in communication with the inside of valve outlet 63 (Fig. 8). Hence, oil or whatever liquid is in the tank 20 at this level will flow through pipe 68 and out through valve outlet 63. In this position, the opening 73 in the valve member is in connection with the inside of valve outlet 64. No flow, however, takes place since the valve 71 would, in this instance, be closed.

When the end 69 of pipe 68 is disposed downwardly, as may be seen in Figs. 7 and 10, the valve member 62 occupies the position shown in Fig. 9. The opening 72 has moved around to communicate with the inside of outlet valve 64. Hence, flow may take place through pipe 68 and the inside of valve outlet 64. In this position, water or sludge is drawn off through the valve 71. A solid wall of the valve member 62 now closes the inside of valve outlet 63 and no flow may take place to the oil burner or the like. Consequently, whenever water or sludge is being removed, none of these products goes to the utilization apparatus.

When the end 69 of the pipe 68 is downwardly disposed as shown in Figs. 7, 9 and 10, the water or sludge is removed by virtue of the weight of the oil which is above it in the tank and it is assumed to be at a sufficiently high level for this purpose. If the level of liquid in the tank drops to the opening in the tank with which the adapter 67 communicates, water, sludge or oil in the bottom of the tank may be removed by means of siphoning action. If the tank is initially low in contents, the siphoning action may be started by sucking on the pipe terminating valve 71, or if the siphoning passageways are filled with liquid such as when the device starts to operate while the tank has a greater amount of oil in it, the siphoning action will continue on its own and remove all of the remaining liquid in the tank including the water or the sludge in the bottom thereof. For the latter steps to take place the lower end of valve 71 or whatever pipes are connected to the valve outlet 64 must be disposed below the level of the tank.

In order that the end 69 may be disposed closely adjacent to the bottom of the tank and will not be hindered in its rotating movements, the end 69 may be curved as shown. Also, the end 69 may include a slot 75 longitudinally disposed for beer removal of the water or sludge and also to form an orifice for a stream of cleansing fluid which may be forced through valve 71 and the pipe 68 in the reverse direction of flow. By forcing in fluid in this manner, sediment accumulated at the bottom of the tank may be stirred-up and thereafter drained off. The device being described has the advantage that when the end 69 is directed upwardly, oil is obtained and when the level in the tank drops to this height, flow, of course, stops and the owner is warned that the level in his tank is low. He may, thereafter, turn the end 69 to the horizontal position described whereupon oil again flows for a relatively short while. In the downward position of end 69, the water or sludge may be removed.

In Figs. 11–15, inclusive, there is shown a further embodiment of the invention which may be applied to either the side or the bottom of the tank for removing oil and water or sludge. The device 80 illustrated in Figs. 11–15 comprises essentially a valve having two separate and distinct passageways therethrough, one of which is used for oil and the other of which is used for water or sludge when the device is attached to the side of an oil tank for example. When the device is attached to the bottom of the oil tank, this being done without other modification of the device, the passageways through the valves are reversed in function, that is to say, the one which in the first instance was used for oil is used for water or sludge and the one which in the first instance was used for water or sludge is used for oil.

The device 80 includes a valve body 81 into which passageways 82 and 83 are formed, the valve member 84 being adapted as shown to close the passageway 82 thereby preventing flow therethrough. A handle 85 is provided for this purpose. The passageways 82 and 83 are intended to have oil flow therethrough when the device is attached to the side of the tank as shown in Fig. 13. Also, formed in valve body 81 are passageways 86 and 87 (Figs. 13 and 14), a valve member 88 being disposed to close passageway 87 as may be seen best in Fig. 14. A handle 89 is provided for this purpose. The passageways 86 and 87 are intended to have water or sludge flow therethrough when the device is attached to the side of the tank. For this purpose a curved pipe 91 is attached to the valve body and is in communication with the passageway 86. The curved end of pipe 91 projects downwardly as may be seen in Fig. 13 and thus projects into the water or sludge in the bottom of the tank.

Oil, of course, will flow out through passageway 82 whenever there is oil in the tank to a sufficient level. Water or sludge will be removed through pipe 91 whenever valve member 88 is open and the oil level is sufficiently high to cause flow to take place. The siphoning action may be started and utilized to remove water or sludge in the same manner as described in connection with the device illustrated in Figs. 4 to 10, inclusive.

The passageways 82 and 86 form, in essence, chamber means and passageways 83 and 87 are, in essence, outlets therefrom.

Referring to Fig. 15, the device 80 is shown attached to the bottom of a tank. It will be seen that the pipe 91 extends upwardly and the end thereof is disposed in oil. Oil will flow through pipe 91 and out through the passageways 86 and 87 under the control of the valve handle 89. Water or sludge will flow out through the passageways 82 and 83 under the control of valve handle 85. It will be observed that the portions of the valve have been reversed with respect to the oil and water or sludge which flow therethrough.

While particular embodiments of the invention have been shown, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A device for removing liquid from one level and above in a container and for siphoning liquid from such container from below such level comprising a chamber, inlet means at the upper end of said chamber for connection to such container, outlet means at the upper end of said chamber for liquid from such one level and above, outlet means at the lower end of said chamber for liquid from below such one level, and a pipe extending through said inlet means and being of substantially less cross-sectional area than said inlet means, one end of said pipe openly terminating adjacent said lower outlet means interiorly of said chamber, said pipe having a length so that the other end thereof projects through said inlet means and into such container, and said other end having a downward bend so as to extend below said inlet means to the level from which siphoning is to occur.

2. A device for removing liquid from one level and above in a container and for siphoning liquid from such container from below such level comprising a chamber, inlet means at the upper end of said chamber for connection to such container, outlet means at the upper end of said chamber for liquid from such one level and above, outlet means at the lower end of said chamber for liquid from below such one level, a pipe extending through said inlet means and being of substantially less cross-sectional area than said inlet means, one end of said pipe openly terminating adjacent said lower outlet means interiorly of said chamber, said pipe having a length so that the other end thereof projects through said inlet means and into such container, and said other end having a downward bend so as to extend below said inlet means to the level from which siphoning is to occur, baffle means disposed between said inlet means and said upper end outlet means so as to force liquid flowing between these means to flow under said baffle means.

References Cited in the file of this patent
UNITED STATES PATENTS

| | | |
|---|---|---|
| 264,197 | Saunders | Sept. 12, 1882 |
| 1,042,293 | Tieman | Oct. 22, 1912 |
| 1,063,754 | Weiss | June 3, 1913 |
| 1,188,267 | Girshefski et al. | June 20, 1916 |
| 1,249,886 | Barrus | Dec. 11, 1917 |
| 1,530,087 | MacArthur | Mar. 17, 1925 |
| 1,694,668 | Peters | Dec. 11, 1928 |
| 1,953,525 | Young | Apr. 3, 1934 |
| 2,000,087 | Meeker et al. | May 7, 1935 |
| 2,113,009 | Tears | Apr. 5, 1938 |
| 2,599,466 | Lienhart | June 3, 1952 |
| 2,601,904 | Erwin | July 1, 1952 |
| 2,603,355 | Lewis | July 15, 1952 |
| 2,617,205 | Gram | Nov. 11, 1952 |
| 2,617,302 | Massiot | Nov. 11, 1952 |
| 2,619,187 | Hayes et al. | Nov. 25, 1952 |
| 2,626,054 | Henigman | Jan. 20, 1953 |
| 2,673,748 | Shaw | Mar. 30, 1954 |